United States Patent
Yu et al.

(10) Patent No.: US 10,938,291 B2
(45) Date of Patent: Mar. 2, 2021

(54) ELECTROMAGNETIC DRIVING MECHANISM

(71) Applicant: TDK TAIWAN CORP., Taoyuan (TW)

(72) Inventors: Cheng-Kai Yu, Taoyuan (TW); Liang-Ting Ho, Taoyuan (TW); Shu-Shan Chen, Taoyuan (TW); Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 269 days.

(21) Appl. No.: 16/049,382

(22) Filed: Jul. 30, 2018

(65) Prior Publication Data

US 2019/0115819 A1 Apr. 18, 2019

(30) Foreign Application Priority Data

Oct. 18, 2017 (CN) .......................... 201710978210.1

(51) Int. Cl.
*H02K 41/035* (2006.01)
*H02K 11/215* (2016.01)
*G02B 13/00* (2006.01)
*G03B 13/34* (2021.01)
*G02B 7/04* (2021.01)

(52) U.S. Cl.
CPC .......... *H02K 41/0356* (2013.01); *G02B 7/04* (2013.01); *G02B 13/001* (2013.01); *G03B 13/34* (2013.01); *H02K 11/215* (2016.01)

(58) Field of Classification Search
CPC ........ B62D 65/18; G02B 13/001; G02B 7/04; G02B 7/08; G03B 13/34; G03B 2205/0069; G03B 3/10; G03B 5/02; H02K 11/215; H02K 41/0356
See application file for complete search history.

(56) References Cited

U.S. PATENT DOCUMENTS

| | | | | |
|---|---|---|---|---|
| 2005/0146637 A1* | 7/2005 | Kawauchi | ................ | G03B 9/24 348/363 |
| 2012/0229926 A1* | 9/2012 | Wade | ....................... | G02B 7/04 359/824 |
| 2013/0136438 A1* | 5/2013 | Lee | ........................ | G02B 7/08 396/133 |

FOREIGN PATENT DOCUMENTS

TW    I457693 B    10/2014

* cited by examiner

*Primary Examiner* — Joseph P Martinez
*Assistant Examiner* — Vipin Patel
(74) *Attorney, Agent, or Firm* — Muncy, Geissler, Olds & Lowe, P.C.

(57) ABSTRACT

An electromagnetic driving mechanism is provided, including a first member, a second member movably connected to the first member, an electromagnetic driving assembly, and a film. The electromagnetic driving assembly includes a magnet and a coil respectively disposed on the first and second members, so as to move the second member relative to the first member. The film is formed on the second member and has positive magnetic susceptibility.

18 Claims, 9 Drawing Sheets

ELECTROMAGNETIC DRIVING MECHANISM

CROSS REFERENCE TO RELATED APPLICATIONS

The present application claims priority of China Patent Application No. 201710978210.1, filed on Oct. 18, 2017, the entirety of which is incorporated by reference herein.

BACKGROUND OF THE INVENTION

Field of the Invention

The invention relates to a driving mechanism, and more particularly to an electromagnetic driving mechanism that can move a lens using electromagnetic force.

Description of the Related Art

Conventional photo cameras, video cameras, and mobile phones usually comprise an optical system for capturing images. The optical system may vibrate due to external impact and cause deviation of the optical path, causing the images captured by the optical system to be blurry. Taiwan patent No. I457693 discloses a conventional optical image stabilization device. When the autofocus function is executed, a current is applied to the coil, and electromagnetic induction occurs between the coil and the magnet, so that the holder moves with respect to the base along the optical axis of the optical system. Two displacement sensors are disposed in the device to detect the position of the optical axis along the X and Y directions. When the optical axis deviates from the norm, electromagnetic induction can occur between the coils and the magnets, corresponding to the X and Y axes, so as to correct the position of the optical axis. However, owing to the miniaturization of the coils, the magnets, and the displacement sensors, the electromagnetic driving force and the displacement sensing accuracy can be reduced. Therefore, it would be a challenge to achieve miniaturization of the electromagnetic mechanism without affecting performance.

BRIEF SUMMARY OF THE INVENTION

In view of the aforementioned problems, an object of the invention is to provide an electromagnetic driving mechanism for moving a lens, including a first member, a second member movably connected to the first member, an electromagnetic driving assembly, and a film. The electromagnetic driving assembly includes a magnet and a coil respectively disposed on the first and second members to move the second member relative to the first member. The film is formed on the second member and has positive magnetic susceptibility.

An embodiment of the invention further provides an electromagnetic driving mechanism for moving a lens, including a first member, a second member movably connected to the first member, an electromagnetic driving assembly, and a film. The electromagnetic driving assembly includes a magnet and a coil respectively disposed on the first and second members to move the second member relative to the first member. The film is formed on the magnet and has positive magnetic susceptibility, wherein the magnet is located between the film and the coil.

An embodiment of the invention further provides an electromagnetic driving mechanism for moving a lens, including a first member, a second member movably connected to the first member, an electromagnetic driving assembly, and a film. The electromagnetic driving assembly includes a coil and a magnet respectively disposed on the first and second members to move the second member relative to the first member. The film is formed on the first member and located corresponding to the magnet, wherein the film is perpendicular to the optical axis of the lens and has positive magnetic susceptibility.

An embodiment of the invention further provides an electromagnetic driving mechanism for moving a lens, including a first member, a second member movably connected to the first member, an electromagnetic driving assembly, and a film. The electromagnetic driving assembly includes a magnet and a coil respectively disposed on the first and second members to move the second member relative to the first member. The film is formed on the first member and has positive magnetic susceptibility, wherein the film and the magnet attract each other by a magnetic attractive force generated therebetween.

In order to illustrate the purposes, features, and advantages of the invention, the preferred embodiments and drawings of the invention are shown in detail as follows.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The making and using of the embodiments of an electromagnetic driving system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
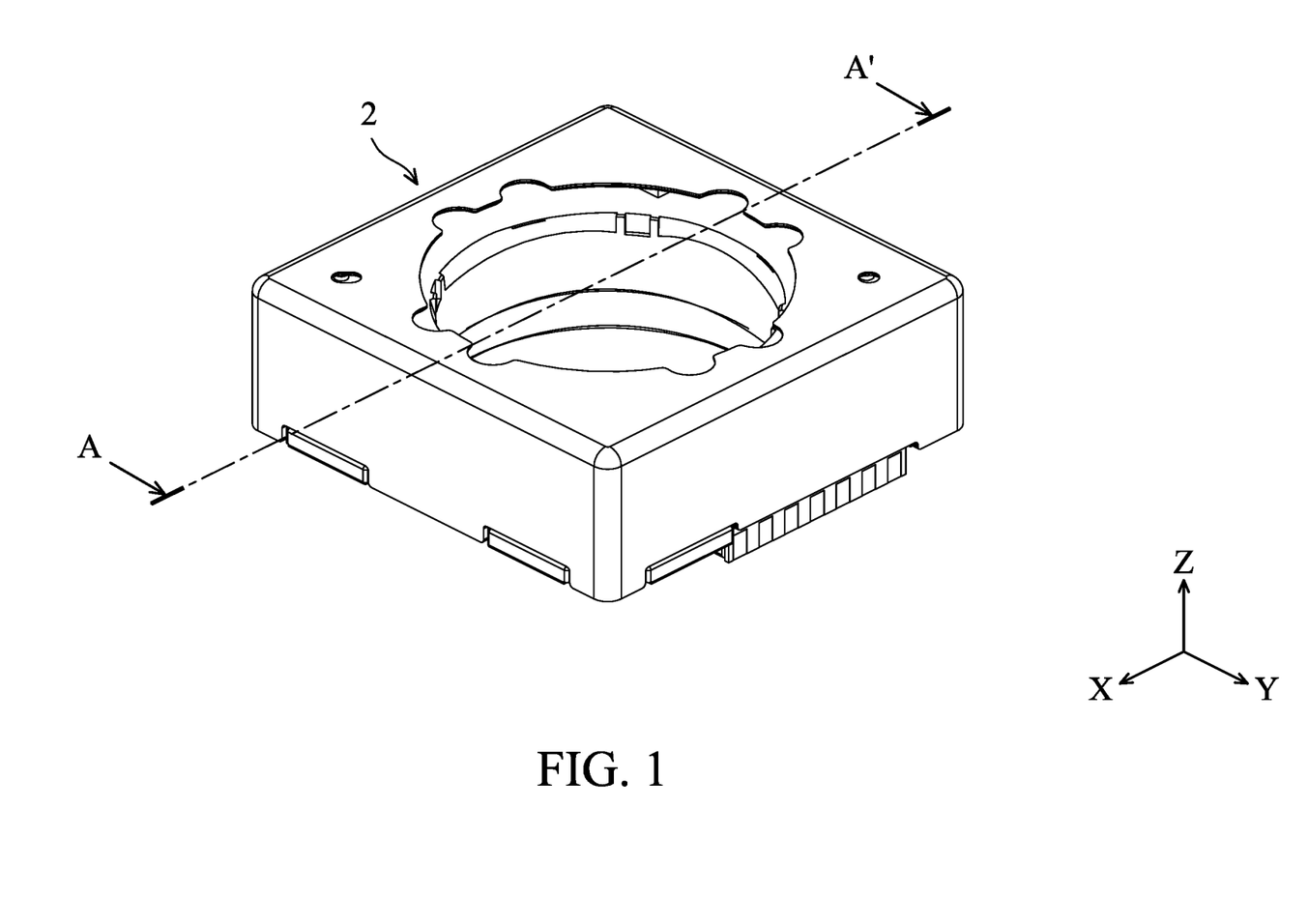
FIG. 1 is a schematic view of an electromagnetic driving mechanism, in accordance with an embodiment of the invention.
Figure 2:
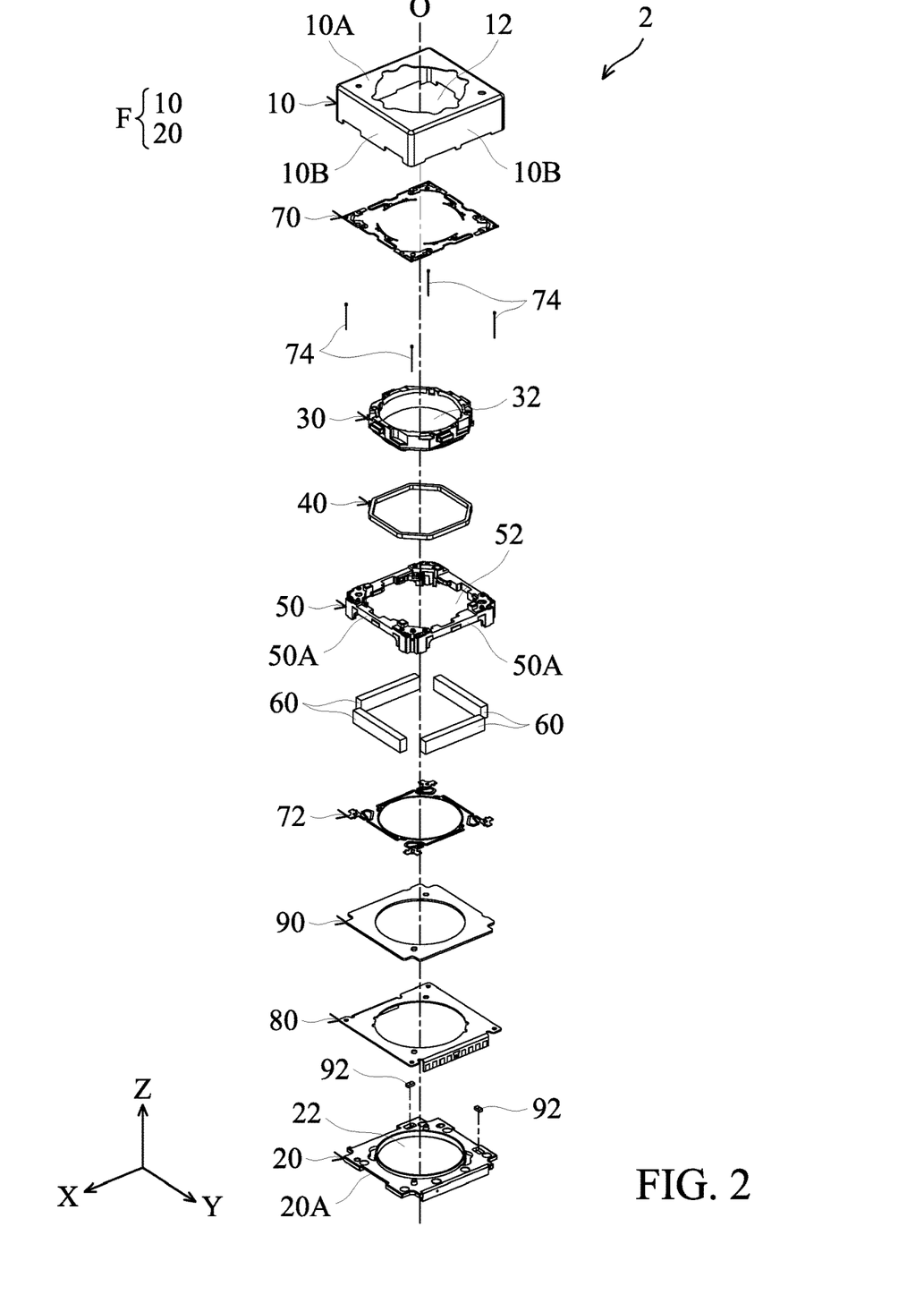
FIG. 2 is an exploded view of the electromagnetic driving mechanism in FIG. 1.
Figure 3:
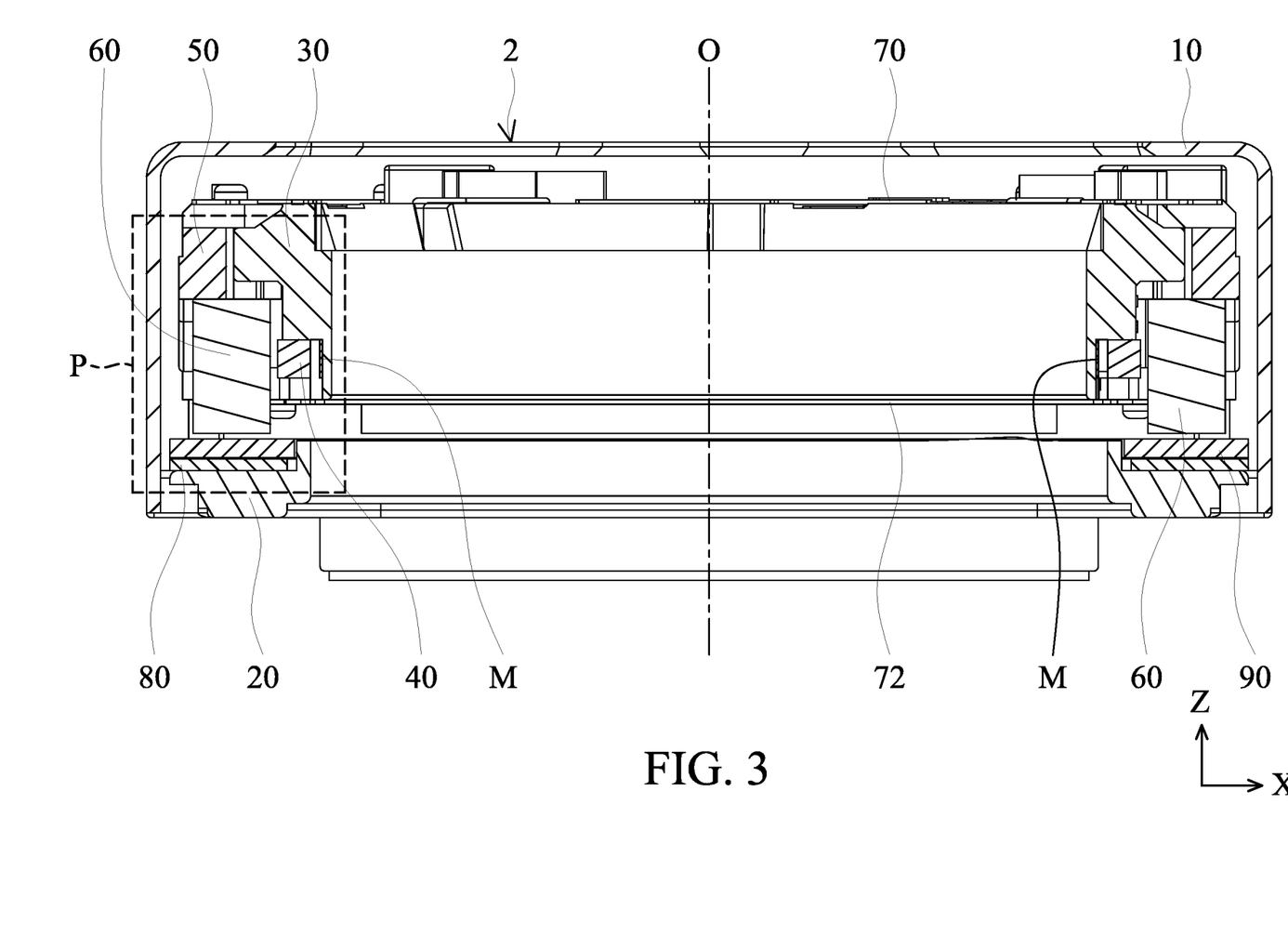
FIG. 3 is a cross-sectional view take along the line A-A' in FIG. 1.

Referring to FIGS. 1-3, FIG. 1 shows a perspective diagram of an electromagnetic driving mechanism 2 in accordance of an embodiment of the invention, FIG. 2 shows an exploded diagram of the electromagnetic driving mechanism 2 in FIG. 1, and FIG. 3 shows a cross-sectional view along the line A-A' in FIG. 1. In this embodiment, the electromagnetic driving mechanism 2 may be a voice coil motor (VCM) equipped with an optical image stabilizer (OIS) function and provided in handheld digital products such as mobile phones or tablet PCs for driving an optical lens.

As shown in FIGS. 1 to 3, the electromagnetic driving mechanism 2 in this embodiment includes a top casing 10, a base 20, a holder 30, a coil 40, a frame 50, four magnets 60, an upper spring 70, a lower spring 72, four suspension wires 74, a circuit board 80, a driving board 90, and two magnetic field sensing elements 92.

The top casing 10 has a hollow structure. Also, the top casing 10 can be combined with the base 20 to form a housing F of the electromagnetic driving mechanism 2, wherein the top casing 10 constitutes a top wall 10A and four sidewalls 10B of the housing F, and the base 20 constitutes a bottom wall 20A of the housing F. In addition, a top casing opening 12 and a base opening 22 are respectively formed on the top casing 10 and the base 20. The center of the top casing opening 12 is located on an optical axis O (parallel to the Z-axis) of a lens (not shown). The base opening 22 is also located on the optical axis O and faces an image sensor (not shown) placed outside the electromagnetic driving mechanism 2. Accordingly, the lens in the electromagnetic driving mechanism 2 and the image sensor can perform image focusing in the direction of the optical axis O.

The frame 50 has an opening 52 and four frame edges 50A respectively corresponding to the four sidewalls 10B of the housing F. In this embodiment, the four magnets 60 are affixed to the four frame edges 50A. In some embodiments, the four magnets 60 may also be affixed to four corners of the frame 50. The shape of the magnets 60 may be a long strip or a triangle.

The holder 30 has a annular structure and a through hole 32. The through hole 32 forms a threaded structure (not shown) corresponding to another threaded structure on the outer peripheral surface of the lens, such that the lens can be secured in the through hole 32. The coil 40 is wound around the outer peripheral surface of the holder 30.

In this embodiment, the holder 30 and the lens therein are movably disposed in the frame 50. More specifically, the holder 30 is suspended in the center of the frame 50 by the upper spring 70 and the lower spring 72 made of a metal material. When a current is supplied to the coil 40, the coil 40 can act with the magnetic field of the magnets 60 to generate an electromagnetic force to move the holder 30 and the lens therein along the Z axis with respect to the frame 50. For example, the four magnets 60 may comprise at least one multipolar magnet which is used to electromagnetically act with the coil 40 to move the holder 30 and the lens along the optical axis O so as to perform image focusing.

Moreover, the outer peripheral portions of the upper and lower springs 70 and 72 are respectively connected to the upper and lower sides of the frame 50, and the inner peripheral portions of the upper and lower springs 70 and 72 are respectively connected to the upper and lower sides of the holder 30, so that the holder 30 can be suspended in the frame 50.

The circuit board 80, such as a flexible printed circuit board (FPC), is affixed to the base 20 by adhesion, for example. In this embodiment, the circuit board 80 is electrically connected to a driving unit (not shown) placed outside the electromagnetic driving mechanism 2 to perform OIS and AF functions.

One end of the four suspension wires 74 is affixed to the circuit board 80 and the other end is connected to the upper spring 70, so that the suspension wires 74 can suspend the frame 50 and the holder 30 therein in the housing F. The suspension wires 74 may comprise a metal material.

The driving board 90 such as a printed circuit board, has four coils (not shown) therein. The positions of the four coils in the driving board 90 respectively correspond to the positions of the four magnets 60 (wherein the two coils are parallel to the X-axis direction and the other two coils are parallel to the Y-axis direction). The driving board 90 is affixed to the circuit board 80 by adhesion, for example.

It should be realized that the circuit board 80 is provided with wiring (not shown) for transmitting electrical signals to the coil 40 and the coils in the driving board 90. In some embodiments, the wiring on the circuit board 80 may be electrically connected to the coil 40 through the suspension wires 74 and the upper spring 70, thereby controlling the movement of the holder 30 along the optical axis O.

In this embodiment, two magnetic field sensing elements 92 are respectively mounted on two sides of the base 20 extending in the X-axis and Y-axis directions. The two magnetic field sensing elements 92 may be Hall effect sensors, MR sensors, or Fluxgate sensors, electrically connected to the circuit board 80 and can be used to learn the position offset amount of the frame 50 and the holder 30 with respect to the base 20 in the X-axis and Y-axis directions by detecting the magnetic field variation of the magnetic elements 60 on the frame 50.

Furthermore, the circuit board 80 can generate electrical signals to be transmitted to the coils in the driving board 90, and the coils in the driving board 90 can act with the magnets 60 on the frame 50 to generate an electromagnetic force to move the frame 50 and the holder 30 therein along a direction that is perpendicular to the optical axis O (parallel to the XY plane) to compensate for the position offset described above. As a result, the OIS function is achieved.

Figure 4:
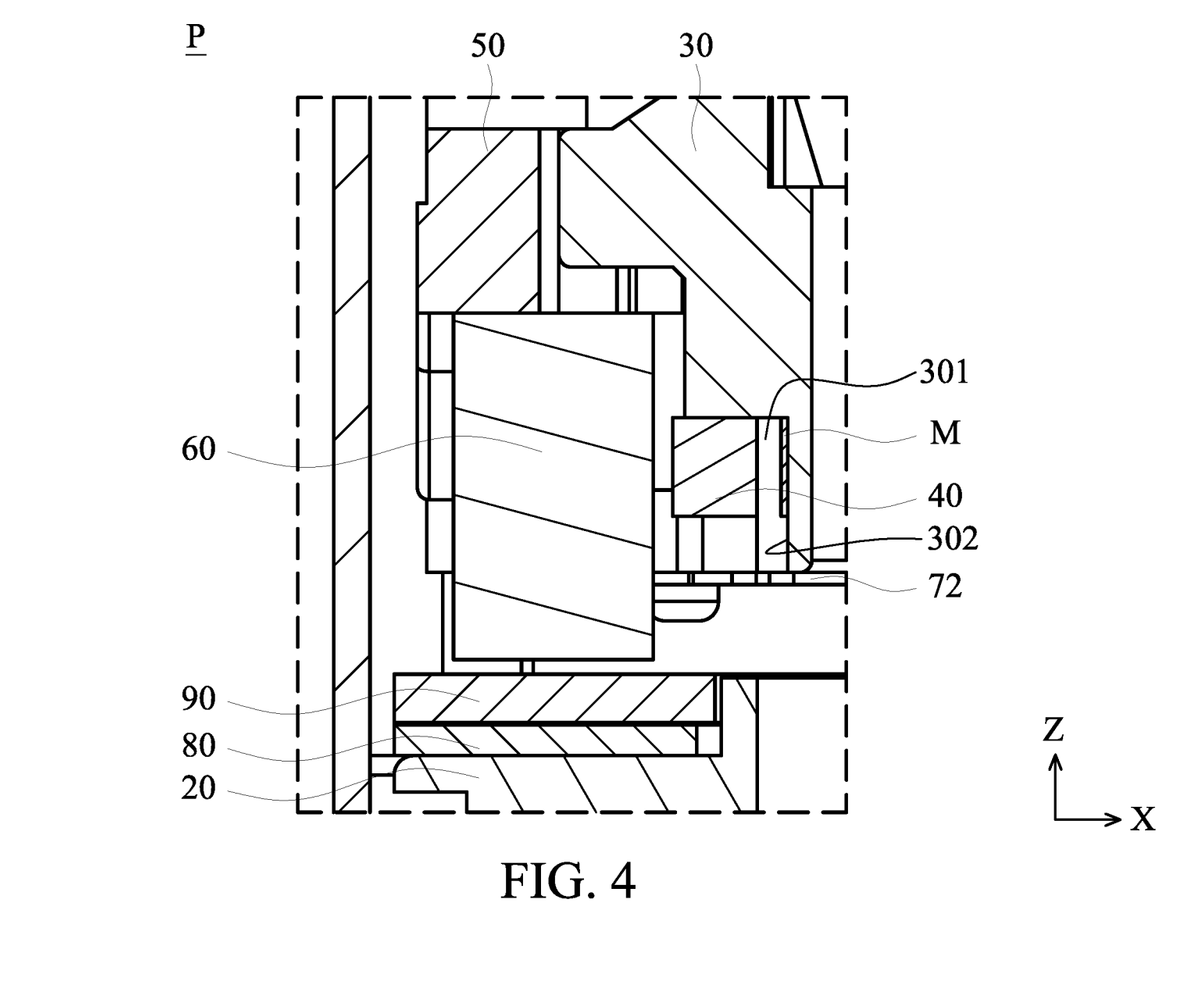
FIG. 4 is an enlarged view of the portion P in FIG. 3.

FIG. 4 shows an enlarged view of the portion P in FIG. 3. As shown in FIG. 4, the magnet 60 and the coil 40 can constitute an electromagnetic driving assembly to move the holder 30 and the lens therein relative to the frame 50 along the Z axis, wherein the coil 40 is disposed around an outer surface of the holder 30. In this embodiment, the holder 30 forms a recess 301 that has a surface 302 with a film M formed thereon, and the film M is parallel to the optical axis O of the lens and corresponds to the coil 40 and the magnet 60.

It should be noted that the film M has positive magnetic susceptibility and is integrally formed on the holder 30, the frame 50, the base 20, or on/in the magnet 60 by electroplating, evaporation coating, sputtering, Laser Direct Structuring (LDS), Molded Interconnect Device (MID) technology, or insert molding. In an exemplary embodiment, the film M may comprise ferromagnetic material such as Fe, Ni, Co or an alloy thereof. In another exemplary embodiment, the film M may comprise paramagnetic material such as Al, Cr, Mo, Ti, Zr or an alloy thereof.

As the film M of high magnetic susceptibility is formed on the surface of the holder 30, and the coil 40 is located between the magnet 60 and the film M, the magnetic flux density between the coil 40 and the magnet 60 can be enhanced, so as to increase the electromagnetic driving force generated by the coil 40 and the magnet 60. Additionally, since the he film M is integrally formed on the surface 302 of the holder 30, no other component is required to be assembled, thus facilitating miniaturization of the electromagnetic driving mechanism.

In some embodiments, the positions of the coil 40 and the magnet 60 may be exchanged. For example, the coil 40 can be disposed on the frame 50, and correspondingly, the magnet 60 is disposed on the holder 30. The only requirement is that the film M should be disposed on an outer side of the electromagnetic driving assembly constituted by the coil 40 and the magnet 60 (e.g. formed on the surface of the holder 30 and the frame 50), whereby the magnetic flux density between the coil 40 and the magnet 60 can be enhanced.

Figure 5:
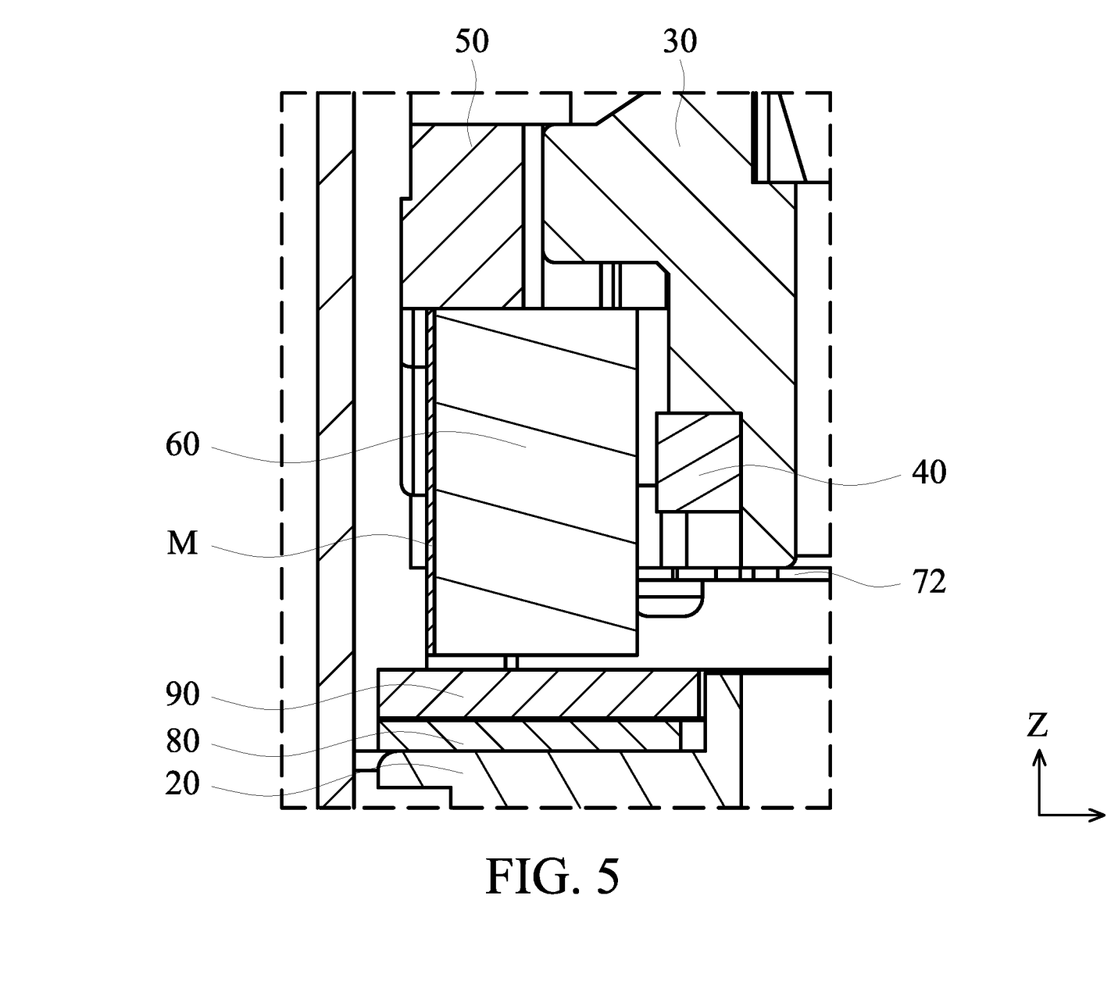
FIG. 5 is a partial enlarged cross-sectional view of an electromagnetic driving mechanism, in accordance with another embodiment of the invention.
Figure 6:
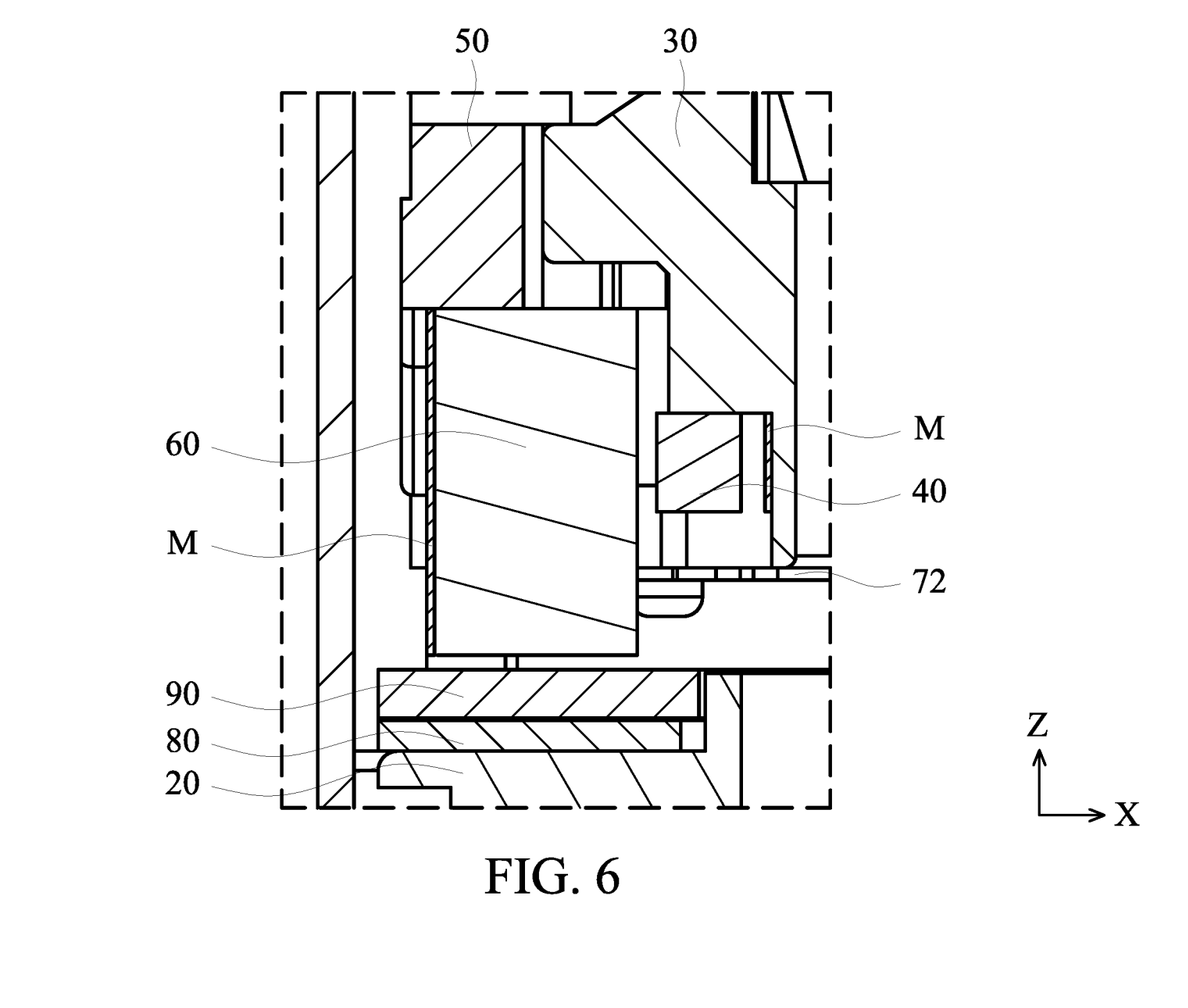
FIG. 6 is a partial enlarged cross-sectional view of an electromagnetic driving mechanism, in accordance with another embodiment of the invention.

In another embodiment of FIG. 5, the film M may be formed on an outer surface of the magnet 60, so that the magnet 60 is located between the coil 40 and the film M. As the film M of high magnetic susceptibility is directly formed on the outer surface of the magnet 60, the magnetic flux density between the coil 40 and the magnet 60 can be enhanced to increase the electromagnetic driving force generated by therebetween. Additionally, since the film M is integrally formed on the surface of the magnet 60, no other component is required to be assembled, thus facilitating miniaturization of the electromagnetic driving mechanism. In another embodiment of FIG. 6, two films M are respectively formed on the surfaces of the holder 30 and the magnet 60, so that the electromagnetic driving force generated by the coil 40 and the magnet 60 can be enhanced, and the performance of the AF function can also be improved.

Figure 7:
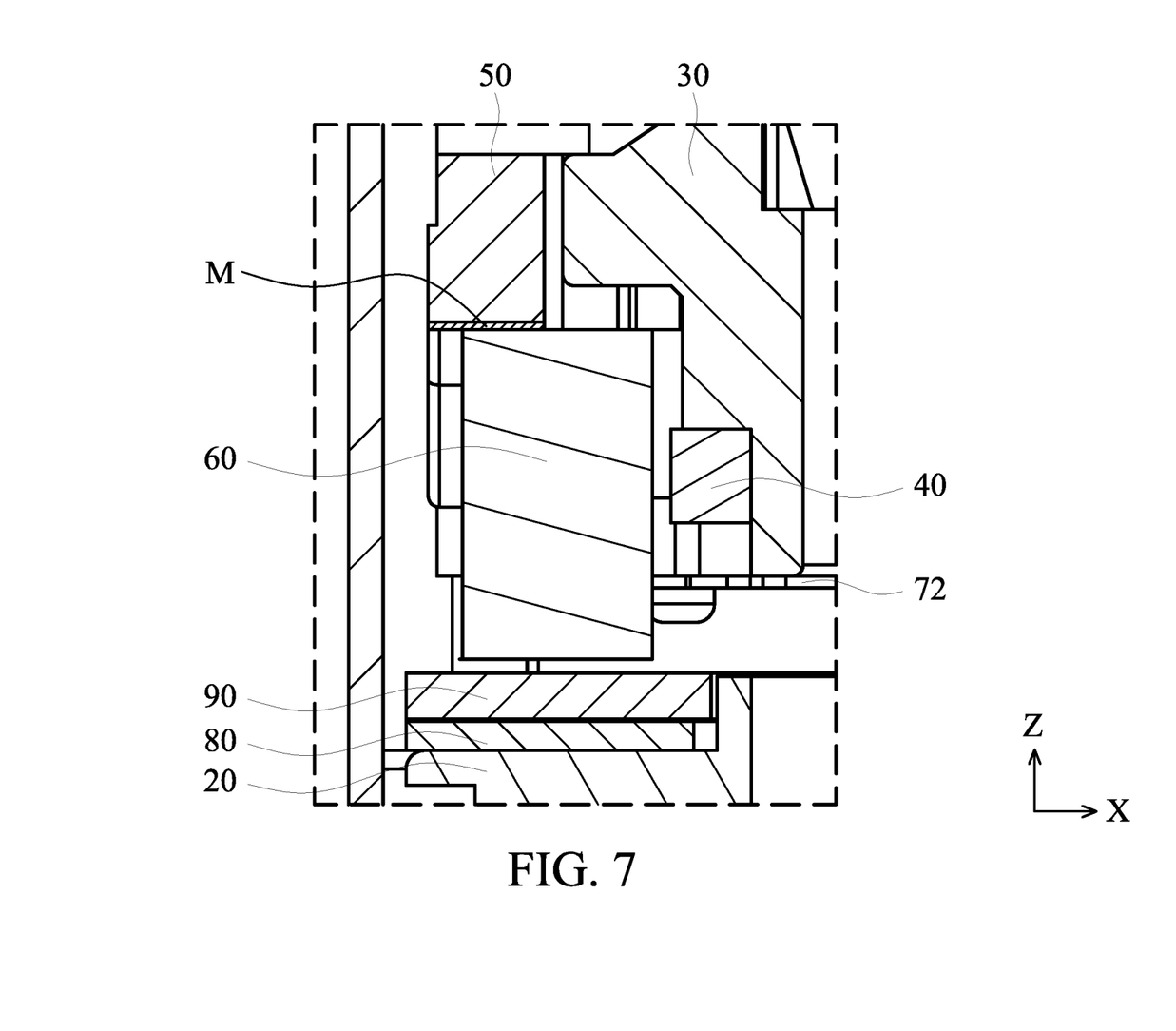
FIG. 7 is a partial enlarged cross-sectional view of an electromagnetic driving mechanism, in accordance with another embodiment of the invention.

Referring to FIG. 7, in another embodiment, the film M is formed on a surface of the frame 50 and adjacent to the magnet 60. As mentioned above, since the film M has positive magnetic susceptibility, when the magnet 60 is close to the film M, they can attract each other by the magnetic attractive force. Thus, the magnet 60 can be automatically positioned in a predetermined position by magnetic attraction and does not need adhesive or any positioning structure, thereby efficiently simplifying the assembly process and reducing the production cost.

Figure 8:
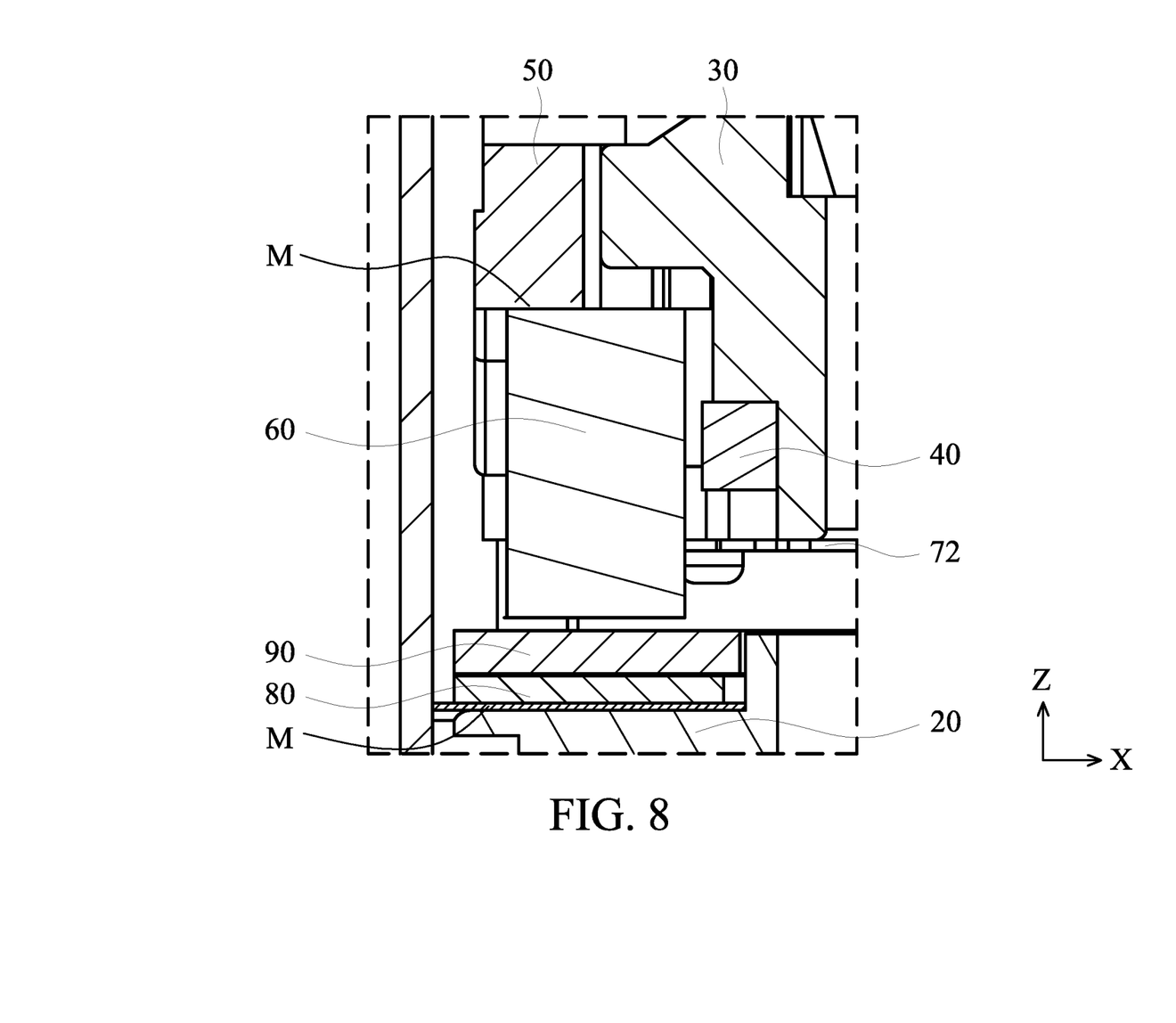
FIG. 8 is a partial enlarged cross-sectional view of an electromagnetic driving mechanism, in accordance with another embodiment of the invention.

Referring to FIG. 8, the film M in another embodiment is formed on the base 20 and perpendicular to the optical axis O of the lens. Here, the magnet 60 on the frame 50 and a coil (not shown) on/in the driving board 90 can constitute an electromagnetic driving assembly, so that the frame 50, the holder 30 and the lens therein can be moved relative to the base 20 along a horizontal direction to perform the OIS function. It should be noted that the film M has positive magnetic susceptibility, and the coil on/in the driving board 90 is located between the magnet 60 and the film M, so that the magnetic flux density between the magnet 60 and the coil on/in the driving board 90 can be enhanced, to increase the electromagnetic driving force generated by the coil 40 and the magnet 60 and improve the performance of the OIS function.

Figure 9:
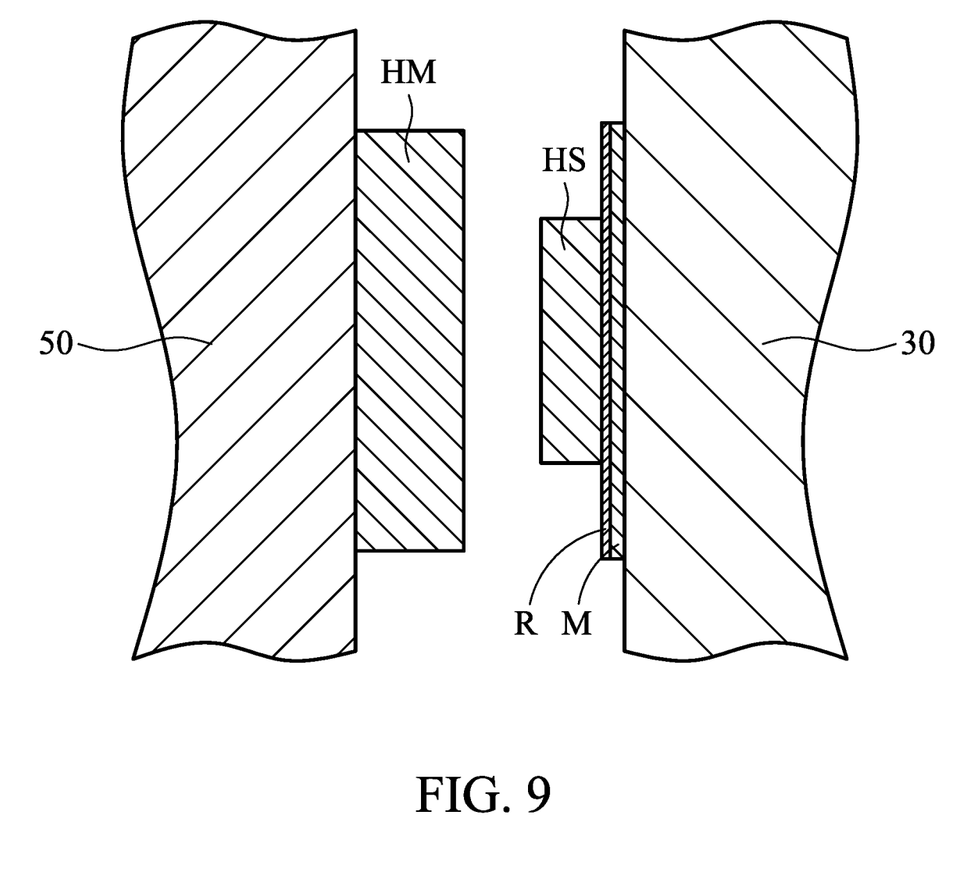
FIG. 9 is a partial enlarged cross-sectional view of an electromagnetic driving mechanism, in accordance with another embodiment of the invention.

Referring to FIG. 9, in an electromagnetic driving mechanism 2 of another embodiment, a sensing element HS is disposed on a side of the holder 30, and a magnet HM is disposed on the frame 50 and corresponds to the sensing element HS. The sensing element HS and the magnet HM can constitute a position sensing assembly, to obtain the position offset amount between the holder 30 and the frame 50 by using the sensing element HS to detect the position of the magnet HM.

FIG. 9 clearly shows that the film M and an electrically insulating layer R are formed on a side surface of the holder 30, wherein the film M is located between the holder 30 and the insulating layer R, and the sensing element HS is disposed on the insulating layer R. It should be noted that the film M has positive magnetic susceptibility, and the sensing element HS is located between the magnet HM and the film M, so that the magnetic flux density between the sensing element HS and the magnet HM can be enhanced to improve the sensitivity and accuracy of position detection.

In an exemplary embodiment, the magnet HM and a coil in the electromagnetic driving mechanism 2 (such as the coil 60 or the coil disposed in the driving board 90) may also constitute an electromagnetic driving assembly to move the holder 30 and the lens therein relative to the frame 50 along the Z axis (or moving the holder 30 and the frame 50 together relative to the base 20 along a horizontal direction). That is, the magnet HM can be used as a part of a position sensing assembly and a part of an electromagnetic driving assembly at the same time.

The positions of the sensing element HS and the magnet HM in FIG. 9 can also be exchanged. For example, the sensing element HS can be affixed to the frame 50, and the magnet HM can be affixed to the holder 30. Similarly, the film M and the insulating layer R may be formed on the frame, or the film M may be directly formed on a surface of the magnet HM, so that the magnet HM is located between the frame 50 and the film M to improve the position sensing accuracy of the frame 50 and the holder 30. In an exemplary embodiment, the sensing element HS may be Hall effect sensor, magnetoresisitve (MR) sensor, or Fluxgate sensor.

In summary, the invention provides an electromagnetic driving mechanism including a first member (the frame or the base), a second member (the holder) movably connected to the first member, and an electromagnetic driving assembly including at least a magnet and a coil. Specifically, a film is formed on the second member and has ferromagnetic or paramagnetic material, so that the magnetic flux density between the coil and the magnet can be enhanced, to increase the electromagnetic driving force generated by the coil and the magnet within a compact space and improve the efficiency of the electromagnetic driving mechanism.

In some embodiments, the film may be formed on the first member (the frame), so that the film and the magnet can attract each other by magnetic attractive force generated therebetween, so as to facilitate positioning between the frame and the magnet and simplify the assembly process. In some embodiments, the film may be directly formed on the frame or the holder, so that a sensing element is located between the magnet and the film (or the magnet is located between the sensing element and the film), thus improving the position sensing accuracy of the first and second members and facilitating miniaturization of the mechanism.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

While the invention has been described by way of example and in terms of preferred embodiment, it should to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electromagnetic driving mechanism for moving a lens, comprising:
   a first member;
   a second member, movably connected to the first member;
   an electromagnetic driving assembly, comprising a magnet and a coil respectively disposed on the first and second members, to move the second member relative to the first member;
   a film, formed on the second member and having positive magnetic susceptibility;
   a sensing element, disposed on the first or second member and located corresponding to the magnet, to detect relative movement between the first and second members, wherein the sensing element is located between the film and the magnet; and
   an insulating layer, disposed between the sensing element and the film.

2. The electromagnetic driving mechanism as claimed in claim 1, wherein the film comprises ferromagnetic or paramagnetic material.

3. The electromagnetic driving mechanism as claimed in claim 1, wherein the film comprises Fe, Ni, Co or an alloy thereof.

4. The electromagnetic driving mechanism as claimed in claim 1, wherein the film comprises Al, Cr, Mo, Ti, Zr or an alloy thereof.

5. The electromagnetic driving mechanism as claimed in claim 1, wherein the film is formed on the second member by electroplating, evaporation coating, sputtering, Laser Direct Structuring (LDS), Molded Interconnect Device (MID) technology, or insert molding.

6. The electromagnetic driving mechanism as claimed in claim 1, wherein the film is parallel to an optical axis of the lens.

7. The electromagnetic driving mechanism as claimed in claim 1, wherein the coil is located between the magnet and the film.

8. The electromagnetic driving mechanism as claimed in claim 1, wherein the magnet is located between the coil and the film.

9. An electromagnetic driving mechanism for moving a lens, comprising:
   a first member;
   a second member, movably connected to the first member;
   an electromagnetic driving assembly, comprising a magnet and a coil respectively disposed on the first and second members to move the second member relative to the first member;
   a film, formed on the magnet and having positive magnetic susceptibility, wherein the magnet is located between the film and the coil;
   a sensing element, disposed on the first or second member and located corresponding to the magnet, to detect relative movement between the first and second members, wherein the sensing element is located between the film and the magnet; and
   an insulating layer, disposed between the sensing element and the film.

10. The electromagnetic driving mechanism as claimed in claim 9, wherein the film comprises Fe, Ni, Co or an alloy thereof.

11. The electromagnetic driving mechanism as claimed in claim 9, wherein the film comprises Al, Cr, Mo, Ti, Zr or an alloy thereof.

12. An electromagnetic driving mechanism for moving a lens, comprising:
    a first member;
    a second member, movably connected to the first member;
    an electromagnetic driving assembly, comprising a coil and a magnet respectively disposed on the first and second members to move the second member relative to the first member;
    a film, formed on the first member and located corresponding to the magnet, wherein the film is perpendicular to the optical axis of the lens and has positive magnetic susceptibility;
    a sensing element, disposed on the first or second member and located corresponding to the magnet to detect relative movement between the first and second members, wherein the sensing element is located between the film and the magnet; and
    an insulating layer, disposed between the sensing element and the film.

13. The electromagnetic driving mechanism as claimed in claim 12, wherein the coil is located between the film and the magnet.

14. The electromagnetic driving mechanism as claimed in claim 12, wherein the film comprises Fe, Ni, Co or an alloy thereof.

15. The electromagnetic driving mechanism as claimed in claim 12, wherein the film comprises Al, Cr, Mo, Ti, Zr or an alloy thereof.

16. An electromagnetic driving mechanism for moving a lens, comprising:
    a first member;
    a second member, movably connected to the first member;
    an electromagnetic driving assembly, comprising a magnet and a coil respectively disposed on the first and second members to move the second member relative to the first member; and
    a film, formed on the first member and having positive magnetic susceptibility, wherein the film and the magnet attract each other by a magnetic attractive force generated therebetween.

17. The electromagnetic driving mechanism as claimed in claim 16, wherein the film has Fe, Ni, Co or an alloy thereof.

18. The electromagnetic driving mechanism as claimed in claim 16, wherein the film has Al, Cr, Mo, Ti, Zr or an alloy thereof.

* * * * *